April 23, 1957   J. M. PESTARINI   2,790,123
ELECTRIC POWER PLANT
Filed June 23, 1954   3 Sheets-Sheet 1
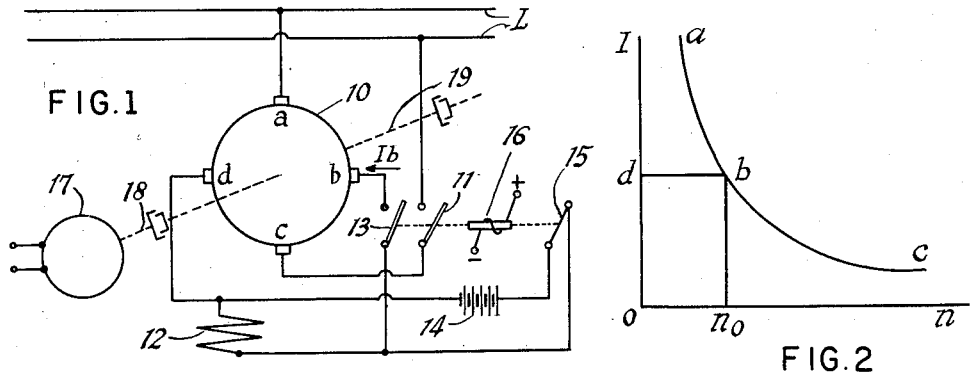
FIG.1
FIG.2
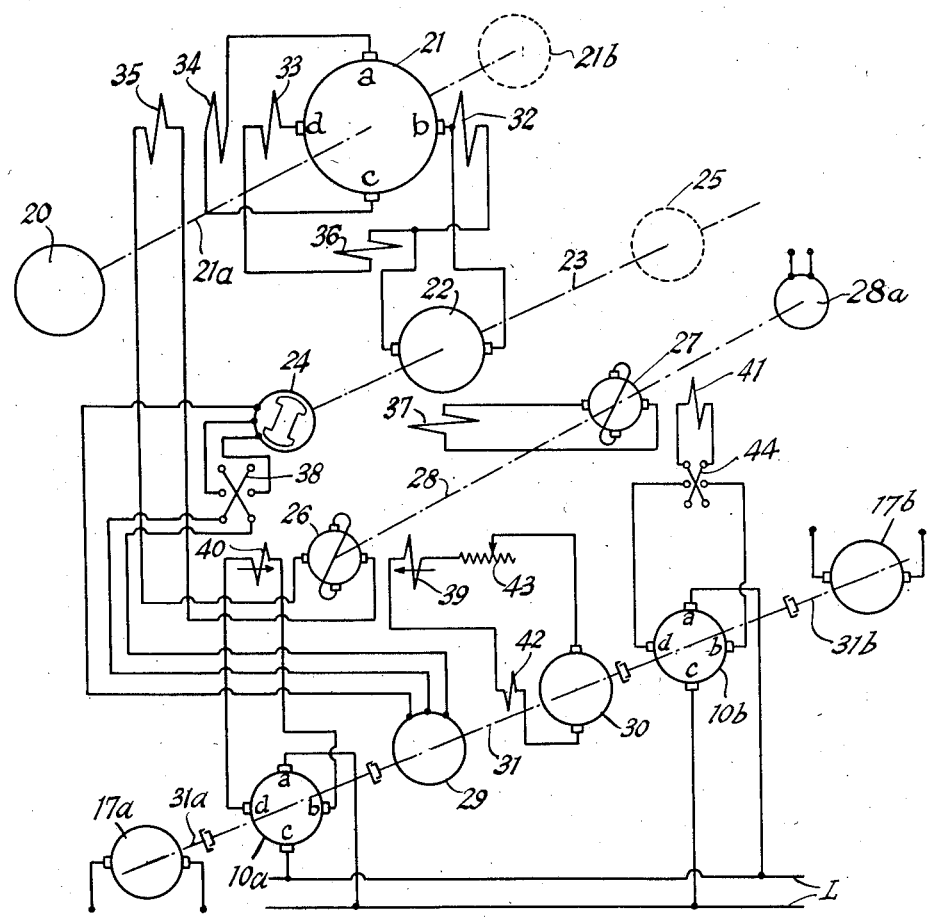
FIG.3
INVENTOR
Joseph M. Pestarini
BY
ATTORNEY April 23, 1957  J. M. PESTARINI  2,790,123
ELECTRIC POWER PLANT
Filed June 23, 1954  3 Sheets-Sheet 2

INVENTOR
Joseph M. Pestarini
BY
ATTORNEY

April 23, 1957     J. M. PESTARINI     2,790,123
ELECTRIC POWER PLANT

Filed June 23, 1954     3 Sheets-Sheet 3

INVENTOR
Joseph M. Pestarini
BY
ATTORNEY

United States Patent Office  2,790,123
Patented Apr. 23, 1957

2,790,123

ELECTRIC POWER PLANT

Joseph M. Pestarini, Minneapolis, Minn.

Application June 23, 1954, Serial No. 438,785

15 Claims. (Cl. 318—146)

This invention relates to electric power plants for driving heavy equipment such as the reversible rollers of a steel mill or the like.

An object of this invention is to provide improved electric power equipment for supplying power to a motor at any selected speed varying from zero to maximum and in either direction within a minimum time interval by developing the maximum possible value of the torque within predetermined overload limits and consistent with other conditions such as avoidance of mechanical and electrical overloads.

Another object of this invention is to provide power equipment including a generator for energizing a motor wherein the current is limited to values inversely proportional to the motor speed except for a range of low speed where the safe maximum value may be constant.

A further object of this invention is to provide electric power equipment wherein the torque for a predetermined speed is allowed to vary between zero and its maximum value as defined by the maximum safe current passing between the generator and motor, the torque varying automatically to equal the counter torque offered by the load as it varies.

Yet another object of this invention is to provide a power plant arranged to supply a peak torque exceeding the maximum torque of the motor at a given speed, by a flywheel without overload of the motor and in accordance with an improved torque-speed characteristic and a predetermined current-speed characteristic.

Still another object of this invention is to provide a power plant including a motor, which when operated in a range of high speeds, the maximum voltage supplied by the generator at any given instant is utilized independently of the motor speed, thereby reducing the excitation of the motor to values inversely proportional to the motor speed for a range of high speeds.

Other objects of this invention will in part be obvious and in part hereinafter pointed out.

In the drawings:

Fig. 1 is a diagrammatic showing of a control portion of a power plant embodying the invention;

Fig. 2 is a chart showing the performance characteristics of the arrangement shown in Fig. 1;

Fig. 3 is a diagrammatic showing of a power plant embodying the invention;

Figure 4:
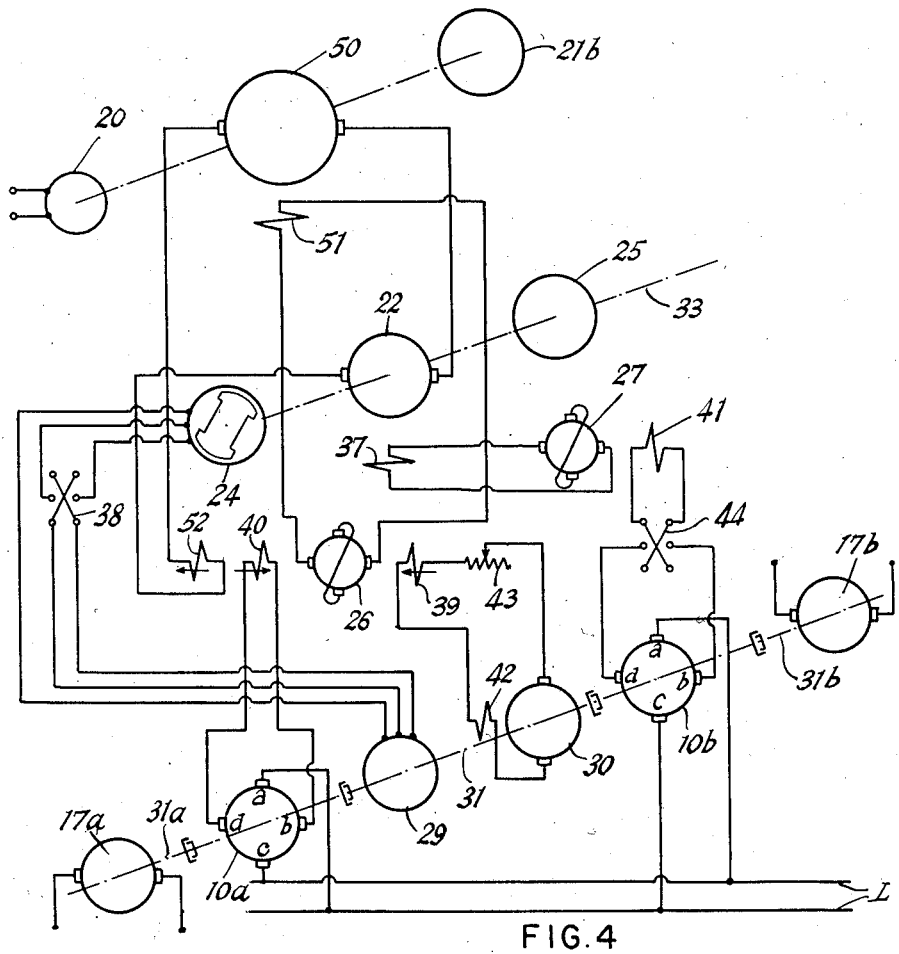
Fig. 4 shows a modification thereof.

Referring in detail to the drawings, and particularly to Fig. 1, 10 designates a dynamoelectric machine known as a medadyne and distinguished by a pair of primary brushes $a$, $c$ associated with the commutator thereof and connected to a constant voltage direct current line L through a switch 11. The metadyne 10 further includes a pair of secondary brushes $b$, $d$ connected to a load in the form of a control winding 12 of a machine not shown, the winding 12 being in circuit with a switch 13 and an auxiliary source of current 14 and a switch 15.

The switches 11, 13, 15 are arranged for simultaneous operation by a relay 16, whereby winding 12 may be selectively connected to the secondary brushes of the metadyne 10 or to the current source 14. The metadyne 10 may be driven by an auxiliary motor 17 through a shaft coupling 18 at a predetermined constant speed, or by a shaft 19 coupled to a variable speed machine, not shown, at a variable speed, the metadyne being connected to said shafts by suitable clutch means as shown. The metadyne is connected to shaft 19 whenever the same rotates at a speed exceeding the predetermined constant speed of shaft 18.

The metadyne 10 has no stator windings; accordingly, it will supply through its secondary brushes an output current $I_b$ which is inversely proportional to the rotational speed of the metadyne. The primary voltage $E_{ac}$ impressed on the primary brushes of metadyne 10 is balanced by a counter electromotive force due to the ampere turns created by the secondary current $I_b$ according to the following equation: $E_{ac}=nkI_b$, where $n$ is the rotational speed of the metadyne 10 and $k$ is a constant. Accordingly, as the speed $n$ varies, current $I_b$ must vary along a hyperbolic curve. Assume first, that relay 16 is operated to close switches 11, 13 and opening switch 15. When shaft 19 is driving the metadyne, the load winding 12 is energized by a current which may be represented by the hyperbolic curve $abc$ when plotted against speed, as indicated in Fig. 2. If, at a predetermined speed $n_0$ the metadyne 10 is disengaged from shaft 19 and is driven by motor 17 through shaft 18, the current supplied to winding 12 will be represented by the ordinates of the segment $db$.

Therefore, the winding 12 will be energized by a current represented by the ordinates of the lines $dbc$, as a function of the variable speed $n$, the speed $n_0$ being the abscissa of the intersection of line $db$ and the curve $abc$. The same result may be accomplished by operating relay 16 to close switches 11, 13 and to open switch 15 for such time intervals when the variable speed $n$ is less than speed $n_0$. In this case, motor 17 is disconnected from metadyne 10.

The complete power plant embodying the invention, shown in Fig. 3, includes a suitable prime mover 20, which may take the form of an asynchronous motor, for driving a generator metadyne 21 through a shaft 21$a$, a flywheel 21$b$ being secured to said shaft, particularly if prime mover 20 does not operate at a constant speed. The system further includes a main motor 22 energized by the output of the metadyne 21 derived from the secondary brushes $b$, $d$ thereof, the motor 22 driving a shaft 23 to which is coupled the mechanical load such as the reversible rollers of a steel mill, not shown.

A small three phase alternator 24 and a flywheel 25 are also coupled to shaft 23. Further included in the system are a pair of amplifier metadynes 26, 27 coupled together by a shaft 28 and respectively controlling the excitation of generator metadyne 21 and motor 22. Also, a three phase motor 29 energized by alternator 24, is coupled to a regulator dynamo 30 by a shaft 31. A metadyne 10$a$, similar to metadyne 10 shown in Fig. 1, is adapted to be driven by shaft 31, or alternatively, by a motor 17$a$ through shaft 31$a$, as hereinafter described. A second metadyne 10$b$, similar to metadyne 10$a$, is also adapted to be driven by shaft 31 or by a motor 17$b$ through a shaft 31$b$.

The metadynes 10$a$, 10$b$ function in a manner similar to that described in connection with metadyne 10, shown in Fig. 1, the input to brushes $a$, $c$ being supplied by line L and the output of brushes $b$, $d$ being supplied to windings 40, 41 of amplifier metadynes 26, 27 respectively, said windings corresponding to winding 12 of metadyne 10.

The generator metadyne 21, which may be of the S type more specifically described in applicant's Patent 2,112,604 includes a pair of primary brushes $a$, $c$ associated with a commutator which also carries secondary brushes $b$, $d$ connected to the input of motor 22. The generator metadyne also comprise control stator windings 32, 33, 34, 35 whose magnetic axes coincide with secondary commutating axis of the metadyne and a control stator winding 36 whose magnetic axis coincides with the primary commutating axis of the generator.

Winding 32 is essentially shunt connected across the secondary brushes $b$, $d$ of the generator metadyne 21; the winding 33, also in the secondary brush circuit undercompensates the secondary armature ampere turns; the winding 34 is of low resistance in circuit with the short circuited primary brushes $a$, $c$ and stabilizes the primary brush circuit. Winding 35 is energized by the output of amplifier metadyne 26. Winding 36 is of low resistance and stabilizes the secondary circuit of the generator. The use of windings 32, 33, 34 and 36 is optional.

The motor 22 includes an excitation winding 37 energized by the output of amplifier metadyne 27. A reversing switch 38 is connected between alternator 24 and motor 29 for inverting two of the three phases. The amplifier metadynes 26, 27 are driven at constant speed by a motor 28a, which is coupled to shaft 28. The amplifier metadynes are more particularly described in applicant's British Patent 420,167. Amplifier metadyne 26 includes stator windings 39, 40 whose magnetic axes coincide with the secondary commutating axis and the ampere turns thereof are in opposed relation. Amplifier metadyne 27 includes a stator winding 41 whose magnetic axis also coincides with its secondary commutating axis.

Winding 39 is energized by the output of a regulator dynamo 30 having a series excitation winding 42, through a rheostat 43. Winding 40 is energized by the output of metadyne 10a. Winding 41 is energized by the output of metadyne 10b through an inverter 44.

The regulator dynamo 30 is continuously driven by motor 29, the critical building up speed of the dynamo being established by the setting of rheostat 43. The metadyne 10a is adapted to be driven from shaft 31 by motor 29, when the speed exceeds the predetermined speed $n_s$ and is driven by the constant speed motor 17a for speeds less than $n_s$. Similarly, metadyne 10b is driven from shaft 31 or by constant speed motor 17b, as the speeds are greater or lesser than the speed $n_p$.

The metadynes 10a, 10b have their primary brushes connected to the constant voltage direct current line L. The inverters 38, 44 are arranged for operation in accordance with the change of direction of the angular speed of shaft 23.

Figure 5:
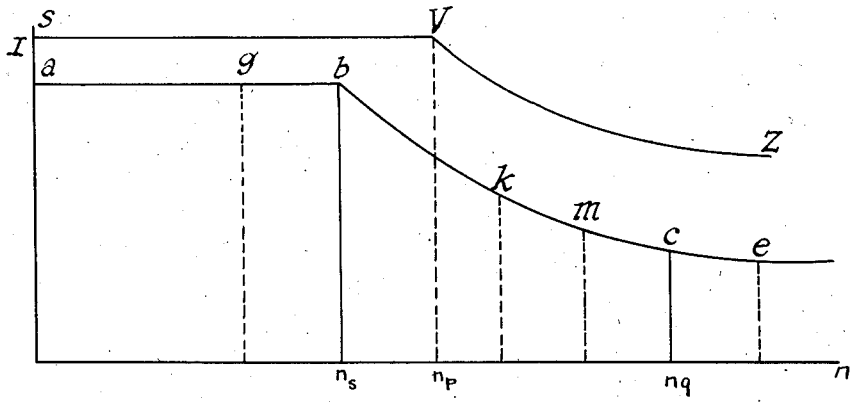
Fig. 5 is a chart showing the current-speed relationships of the generator and motor indicated in Fig. 4.

In operating the system of Fig. 3, the rheostat 43 is set at an arbitrary position, and, assuming that shaft 23 is stationary, metadyne 10a will be driven at the constant speed $n_s$ by suitably clutching the same to motor 17a, and metadyne 10b will be driven at the constant speed $n_p$ by suitably clutching said metadyne to motor 17b. Under these conditions, the metadyne generator 21 will supply a constant current to motor 22 while excitation winding 37 is energized with constant current. Shaft 23 will thereafter rotate in a given direction with constant acceleration until the predetermined speed $n_s$ is attained, at which time metadyne 10a will be suitably clutched to be driven by motor 29 and generator metadyne 21 will thereafter supply a current inversely proportional to the speed of shaft 23 until a speed $n_q$, higher than speed $n_s$, is reached. The speeds $n_s$, $n_p$ and $n_q$ are indicated in Fig. 5, being related to the current curves shown thereon, as more fully explained hereinafter.

When speed $n_p$ is attained, metadyne 10b will be coupled to motor 17b by shaft 31b and the excitation of motor 22 will be reduced along hyperbolic lines so that the motor voltage taken from generator 21 is constant. The speed will still increase with an acceleration inversely proportional to the square of the speed of shaft 23 until the critical speed $n_q$ of the regulator dynamo 30 is reached.

At this time, the ampere turns of winding 39 will be automatically modified so that the motor 22 will develop a torque equal to the counter torque whereby the speed $n$ will be kept constant independently of said counter torque, provided it remains smaller than the maximum torque corresponding to said speed.

If the counter torque increases above the maximum torque value, then the excess torque will be supplied by flywheel 25 and the speed of shaft 23 will be reduced. The regulator dynamo 30 is now deexcited and the motor 22 will develop the maximum torque corresponding to the actual speed $n$ until the peak of the counter torque is eliminated.

If the shaft 23 is to be reversed, reversing switch 44 is operated and rheostat 43 is reset at a proper value. Under these conditions, the motor 22 will brake automatically, developing its maximum torque corresponding to the actual speed until shaft 23 is brought to a standstill. At that instant, the reversing switch 38 is operated and shaft 23 is restarted in the opposite direction and the procedure continues as previously described until the new speed in the opposite direction is attained.

The metadyne 10, shown in Fig. 1, may be operated under either of two sets of conditions. In one case, the metadyne is driven by motor 17 from zero speed to the speed $n_0$ and from variable speed shaft 19 from speed $n_0$ and upwards. Under these conditions, relay 16 is operated to close switches 11, 13 and to open switch 15, thereby connecting the load winding 12 to the secondary brushes of the metadyne and disconnecting current source 14.

In the second case, the metadyne 10 is continuously driven from shaft 19 for all speeds between zero and $n_0$, the relay 16 being operated to close switch 15 and to open switches 11, 13, the winding 12 being energized by current source 14. For speeds exceeding $n_0$, relay 16 is operated to disconnect the current source 14 and to connect the metadyne primary circuit to line L and the secondary circuit to winding 12.

In referring to the system shown in Fig. 3, where metadynes 10a, 10b are similar to metadyne 10, the metadynes 10a, 10b are operated as indicated in the first case above. The speed $n_0$ in connection with metadyne 10 corresponds to speed $n_s$ for metadyne 10a, and speed $n_p$ for metadyne 10b. It is understood that the alternative form of operation may be applied to the system of Fig. 3 with the necessary change in connections permitting the use of the current source 14, as described above.

It is also understood that the flywheel 21b may be made operative when the motor 20 is of the variable speed type supplemented by conventional controls therefor. The metadyne generator 21 shown in Fig. 3 may take forms other than that of the S type, previously described, or may be replaced by a transformer metadyne such as described in Patents 1,945,447 and 2,030,652, as well as in Metadyne Statics by Pestarini, John Wiley & Sons, New York. Alternative forms of amplifier metadynes, known in the art, may replace metadynes 26, 27.

The alternator 24 and motor 29 may be eliminated from the system shown in Fig. 3 by mechanically coupling shafts 23 and 31. It is understood that the series excited regulator dynamo 30 may be replaced by a shunt excited dynamo.

The system shown in Fig. 4 is similar to that of Fig. 3 except as hereinafter described. A dynamo 50 replaces the metadyne generator 21, such dynamo including a stator control winding 51 energized by the output of amplifier metadyne 26. The metadyne 26 includes, in addition to control windings 39, 40, a further control winding 52 connected in the output circuit of dynamo 50 and therefore energized by the current output thereof or by a current proportional thereto. The ampere turns created by winding 52 are in opposition to those of winding 40. The operation of this system is similar to that of Fig. 3.

In Fig. 5 there are plotted the current-speed relationships of the system of the instant invention as shown in Figs. 3 and 4. Thus, the curve SVZ indicates the excitation current energizing the field winding 37 of a main motor 22 and the curve agbkce indicates the current output of generator 21 or dynamo 50. The intersection of the straight line component agb and the hyperbolic component bkce determines the speed $n_s$, at which speed metadyne 10a shifts between driving shafts 31 and 31a, as described above. Similarly the intersection of the straight line component SV and the hyperbolic component VZ determines the speed $n_p$, at which speed metadyne 10b shifts between driving shafts 31 and 31b.

The point c on the curve segment bkce may correspond to the speed $n_q$ which is the critical building up speed of the regulator dynamo 30 and previously indicated as being of a value greater than that of speeds $n_s$, $n_p$. The speeds $n_s$ and $n_p$ are preset at predetermined values. However, speed $n_q$ may be varied by changing the value of rheostat 43 in the excitation circuit of the regulator dynamo 30. Thus, the speed $n_q$ may have other selected values as indicated by dotted lines at points g, k and the like, but not exceeding the safe maximum speed indicated at point e. It will be apparent that various speed-current relationships in respect to the output of the generator 21 or dynamo 50, may be obtained through the presetting of the critical speed of the regulator dynamo 30.

Figure 6:
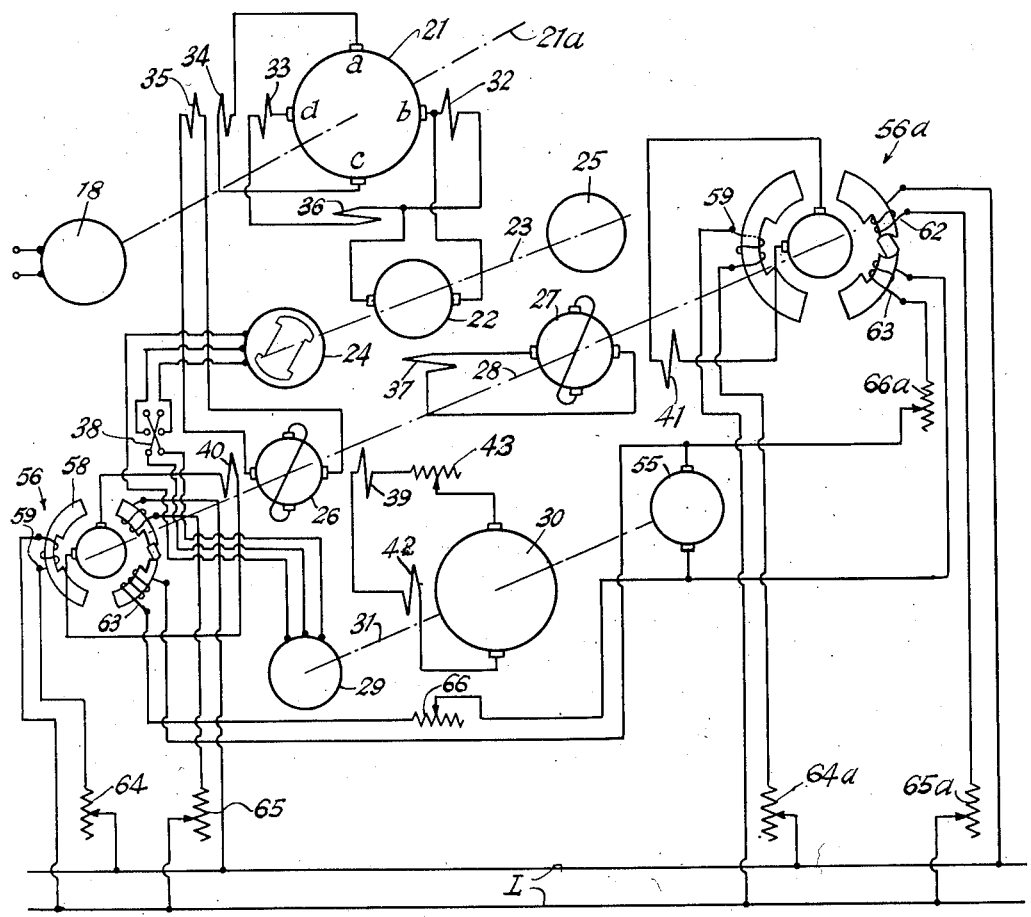
Fig. 6 shows a further modification of the invention.

In Fig. 6, showing a modification of the invention, similar to that of Fig. 3, except that the metadynes 10a, 10b and the driving motors 17a, 17b have been omitted, the motor 29 drives a tachometer generator 55 which is connected in circuit with a pair of similar control dynamos 56, 56a. The dynamos 56, 56a are coupled to amplifier metadynes 26, 27 by shaft 28.

Figure 7:
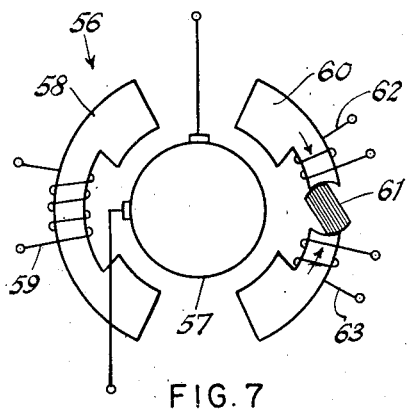
Fig. 7 is a diagrammatic showing of a control dynamo forming a portion of the invention.

As shown in Fig. 7, the control dynamo 56 comprises an armature 57 having a four pole wave pole winding and accordingly, the pair of brushes are disposed at 90° relative to each other. The dynamo 56 further includes a stator having a magnetic circuit portion 58 which is non-saturated and is excited by a winding 59 and a magnetic circuit portion 60 which may be saturated to a predetermined value by the angular shift of a movable portion 61 thereof. The circuit portion 60 is excited by windings 62, 63 disposed in opposed relation to each other.

The windings 59 are energized by the constant voltage direct current line L through rheostats 64, 64a and the windings 62 are similarly energized through rheostats 65, 65a. Windings 63 are energized by a current whose voltage is proportional to the speed of shaft 31, such current being derived from the tachometer generator 55 and is regulated by rheostats 66, 66a.

The ampere turns of windings 62, 63 of dynamos 56, 56a are in opposed relation. In the voltage-speed relationship plotted in Fig. 8, on the axis O'n', referring to the rotational speed of shaft 23, the ordinate OO' represents a constant voltage V" due to the flux created by the magnetic circuit 58. The magnetic circuit 60 induces the voltage V' which is plotted as the curve abcd referred to the axis O'n'. The length of the substantially horizontal segment ab of said curve, due to iron saturation, is determined by the intensity of the current energizing windings 62, as determined by rheostats 65, 65a, while the inclination of curve segment bc is determined by the setting of rheostat 66.

To the voltage V' is added the voltage V", giving a composite voltage which is measured as ordinates of the curve abcd with respect to axis On. Thus, the curve abcd is made up of segment ab which is substantially parallel to the speed axis and segment bcd which is substantially hyperbolically related to said axis.

Figure 8:
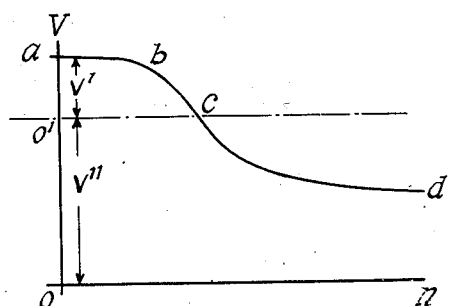
Fig. 8 is a performance curve of said control dynamo.

With dynamo 56a energizing the control winding 41 of amplifier metadyne 27, the current traversing excitation winding 37 is controlled according to characteristics of the form indicated by the curve of Fig. 8. Similarly, with dynamo 56 energizing the control winding 40 of amplifier metadyne 26, the intensity of the current supplied by generator 21 is also controlled according to a characteristic of the form indicated by the curve of Fig. 8. Such curves may be varied through selected settings of rheostats 64, 65, 66 in the case of metadyne 21; and of rheostats 64a, 65a, 66a in the case of motor 22.

The disclosure and showings of the several embodiments of the invention herein are to be deemed illustrative and are not to be interpreted as limiting said invention.

Having thus described my invention, I claim as new and desire to protect by Letters Patent:

1. An electric power system comprising a variable speed motor, dynamoelectric means for energizing said motor, said dynamoelectric means including at least one control winding, means for supplying a variable input to said control winding, a first dynamoelectric machine operative to control said variable input means in response to variations in motor speed between zero and a safe maximum value for regulating the output of said dynamoelectric means, the current of said output being substantially constant for speeds less than a first predetermined speed and substantially inversely proportional for speeds greater than said predetermined speed, a second dynamoelectric machine operative to control said variable input means in response to motor speeds greater than a second predetermined speed corresponding to the critical building up speed of said second dynamoelectric machine whereby the current of the output of said dynamoelectric means drops rapidly to zero when the motor speed reaches said second predetermined speed independently of the control action of said first dynamoelectric machine.

2. An electric power system as in claim 1 wherein said first dynamoelectric machine comprises a metadyne having a commutator with a pair of primary brushes and a pair of secondary brushes associated therewith, a constant voltage direct current source in circuit with said primary brushes, circuit means connecting said secondary brushes to said variable input means, and means for rotating said metadyne at a speed proportional to the motor speed.

3. An electric power system as in claim 1 wherein said second dynamoelectric machine includes a series excitation winding traversed by the building up current at the critical speed thereof.

4. An electric power system as in claim 1 wherein said first dynamoelectric machine comprises stator means having associated therewith a pair of windings in opposed relation to each other, means for energizing one of said windings with a constant current, and means for energizing the other of said windings with a current inversely proportional to the motor speed.

5. An electric power system as in claim 4 wherein said stator means comprises a non-saturated magnetic circuit portion and a saturable magnetic circuit portion, each of said magnetic circuit portions being operative to induce independent electromotive forces.

6. An electric power system as in claim 1 wherein said dynamoelectric means comprises a generator metadyne comprising a commutator having a pair of primary brushes and a pair of secondary brushes associated therewith, circuit means connecting said secondary brushes with said motor and circuit means connecting said control winding with said variable input means.

7. An electric power system as in claim 1 wherein said variable input means comprises a dynamoelectric machine including a control winding and means for energizing said last mentioned control winding with a current proportional to the output current of said dynamoelectric means.

8. An electric power system as in claim 1 wherein said variable input means comprises a dynamoelectric amplifier including a pair of control windings, circuit means connecting one of said last mentioned control windings and said first dynamoelectric machine, and circuit means connecting the other of said last mentioned control windings and said second dynamoelectric machine.

9. An electric power system as in claim 1 wherein said variable input means comprises an amplifier metadyne including a plurality of control windings, circuit means connecting one of said last mentioned windings and said first dynamoelectric machine, circuit means connecting another of said last mentioned windings with said second dynamoelectric machine, and a third of said last mentioned windings being energized by a current proportional to the output current of said dynamoelectric means, said third winding creating ampere turns in opposition to the ampere turns of said one winding.

10. An electric power system as in claim 1 wherein said motor includes an excitation winding, means for supplying a variable input to said excitation winding, and a third dynamoelectric machine operative to control said last mentioned variable input means in response to variations in motor speed whereby the current supplied to said excitation winding is constant at speeds less than a third predetermined speed and is inversely proportional to motor speeds exceeding said third predetermined speed.

11. An electric power system comprising a variable speed motor, dynamoelectric means for energizing said motor, said dynamoelectric means including a control winding, an amplifier metadyne having a variable output in circuit with said winding, said amplifier metadyne including a pair of control windings in opposed relation, a regulator dynamo in circuit with one of said last mentioned windings, means for rotating said regulator dynamo at speeds proportional to the speed of said motor, said regulator dynamo being operative to supply a control current to the winding in circuit therewith at speeds exceeding the critical building up speed thereof, and means for supplying a constant current to the other of said last mentioned windings at motor speeds not exceeding a predetermined value.

12. An electric power system as in claim 11 wherein said motor includes an excitation winding, a second amplifier metadyne having a variable output in circuit with said excitation winding, said amplifier metadyne including a control winding, and means for supplying a constant current to said last mentioned control winding at motor speeds not exceeding a second predetermined value.

13. An electric power system as in claim 12 wherein each of said constant current supply means comprises a dynamoelectric machine rotating at constant speed at motor speeds not in excess of the respective first and second predetermined values, said last mentioned dynamoelectric machines being operative to rotate at speeds proportional to the motor speed when said motor speed exceeds said first and second predetermined values.

14. An electric power system comprising a variable speed motor having an excitation winding, dynamoelectric means for energizing said motor and including a control winding, a dynamoelectric machine for energizing each of said windings, said dynamoelectric machines being operative to supply substantially constant current to said windings in response to motor speeds not exceeding a predetermined value and being further operative to supply currents to said windings which are substantially inversely proportional to the motor speed in response to motor speeds exceeding said predetermined value.

15. A power system as in claim 14, wherein each of said dynamoelectric machines comprises one magnetic member and an exciting winding associated therewith and a second saturable magnetic member having a pair of exciting windings in opposed relation associated therewith, means for energizing said first mentioned exciting winding and one of said pair of exciting windings with a predetermined, substantially constant current, and means for energizing the other of said pair of windings with a current proportional to the motor speed.

References Cited in the file of this patent
UNITED STATES PATENTS

| | | |
|---|---|---|
| 1,945,447 | Pestarini | Jan. 30, 1934 |
| 2,301,689 | Edwards et al. | Nov. 10, 1942 |
| 2,587,648 | Pestarini | Mar. 4, 1952 |
| 2,636,996 | Buess | Apr. 28, 1953 |